(12) United States Patent
Shinde et al.

(10) Patent No.: US 9,728,362 B2
(45) Date of Patent: Aug. 8, 2017

(54) DEAD TANK CIRCUIT BREAKER WITH SURGE ARRESTER CONNECTED ACROSS THE BUSHING TOPS OF EACH POLE

(71) Applicant: ABB Technology AG, Zurich (CH)

(72) Inventors: Sushil A. Shinde, Monroeville, PA (US); Arnold P. Vitols, Delmont, PA (US); Gary Hammack, Greensburg, PA (US); Corey J. Stanko, Greensburg, PA (US); Willie Freeman, Irwin, PA (US)

(73) Assignee: ABB Schweiz AG, Baden (CH)

( * ) Notice: Subject to any disclaimer, the term of this patent is extended or adjusted under 35 U.S.C. 154(b) by 542 days.

(21) Appl. No.: 14/302,455

(22) Filed: Jun. 12, 2014

(65) Prior Publication Data
US 2015/0364285 A1    Dec. 17, 2015

(51) Int. Cl.
*H01C 7/12* (2006.01)
*H01H 83/10* (2006.01)
*H01H 33/16* (2006.01)
*H02H 9/04* (2006.01)

(52) U.S. Cl.
CPC .......... *H01H 83/10* (2013.01); *H01H 33/161* (2013.01); *H02H 9/04* (2013.01); *H01C 7/12* (2013.01)

(58) Field of Classification Search
CPC ........ H01L 2924/00; H01L 2924/0002; H01C 7/12
USPC .......................................................... 361/126
See application file for complete search history.

(56) References Cited

FOREIGN PATENT DOCUMENTS

| FR | 2621734 A1 | 4/1989 |
|----|------------|--------|
| JP | H04127807 A | 4/1992 |
| JP | 2001197617 A | 7/2001 |

OTHER PUBLICATIONS

JP-2001-197617; Entire specification; Figures 1 and 2.*
International Search Report and Written Opinion in PCT/US2015/030247 dated Jul. 30, 2015.

* cited by examiner

*Primary Examiner* — Dharti Patel
(74) *Attorney, Agent, or Firm* — Manelli Selter PLLC; Edward J. Stemberger

(57) ABSTRACT

Surge arrester structure is provided for a dead tank circuit breaker. The circuit breaker has a pole assembly with a first electrical terminal in a first bushing, and a second electrical terminal in a second bushing. The first terminal is electrically connected to a stationary contact and the second terminal is electrically connected to a movable contact. The surge arrester structure includes a surge arrester having first and second opposing ends. A first conductor structure electrically and mechanically connects the first end of the surge arrester with an end of the first terminal. A second conductor structure electrically and mechanically connects the second end of the surge arrester with an end of the second terminal. The surge arrester is electrically connected parallel with respect to the stationary and movable contacts so that the surge arrester can limit transient over voltages occurring across the contacts when the contacts are open.

12 Claims, 3 Drawing Sheets

DEAD TANK CIRCUIT BREAKER WITH SURGE ARRESTER CONNECTED ACROSS THE BUSHING TOPS OF EACH POLE

FIELD

The invention relates to high voltage, dead tank circuit breakers and, more particularly, a surge arrester connected across the tops of each pole in horizontal or vertical configurations.

BACKGROUND

Circuit breakers are commonly found in substations and are operable to selectively open and close electrical connections. Typical dead tank circuit breakers have pole assemblies that include first and second electrical conductors in associated bushings. As is known in the art, electrical power lines are coupled to first and second electrical conductors, and the circuit breaker selectively opens or closes the electrical connection there-between.

Surge arresters are typically used in the industry for lightning impulse protection wherein they are connected line-to-ground closer to the equipment being protected on a separate pedestal. The surge arrester application is very common as transmission line protection connected from overhead line to ground for lightning protection.

Reactor de-energizing is a severe switching duty for any high voltage circuit breaker. The reactors are used for compensation purposes and are switched almost daily. Reactor de-energizing can cause over voltages and re-ignitions and thus a thermal/dielectric failure of an interrupter. Re-ignitions have the potential to be catastrophic to the breaker if current starts flowing again.

There is a need to provide a surge arrester structure that is electrically and physically connected across the circuit breaker contacts for overvoltage protection on special switching applications such as reactor switching applications.

SUMMARY

An object of the invention is to fulfill the need referred to above. In accordance with the principles of the embodiments, this objective is obtained by providing surge arrester structure for a dead tank circuit breaker. The circuit breaker has a pole assembly with a first electrical terminal carried in a first bushing, and a second electrical terminal carried in a second bushing. The first electrical terminal is electrically connected to a stationary contact which is immovably secured within the pole assembly and the second electrical terminal is electrically connected to a movable contact that is slidable within the pole assembly. The surge arrester structure includes a surge arrester having first and second opposing ends. A first conductor structure is constructed and arranged to electrically and mechanically connect the first end of the surge arrester with an end of the first electrical terminal. A second conductor structure is constructed and arranged to electrically and mechanically connect the second end of the surge arrester with an end of the second electrical terminal. The surge arrester is electrically connected parallel with respect to the stationary and movable contacts so that the surge arrester can limit transient over voltages occurring across the contacts when the contacts are open.

In accordance with another aspect of a disclosed embodiment, a method limits transient over voltages occurring across first and second contacts of a circuit breaker when the contacts are open. The method provides a circuit breaker with at least one pole assembly, with a first electrical terminal carried in a first bushing, and a second electrical terminal carried in a second bushing. The first electrical terminal is electrically connected to the first contact and the second electrical terminal is electrically connected to the second contact. A first end of a surge arrester is electrically and mechanically connected with an end of the first electrical terminal. A second end of the surge arrester is electrically and mechanically connected with an end of the second electrical terminal to thereby electrically connect the surge arrester parallel with respect to the contacts so that the surge arrester can limit transient over voltages occurring across the contacts when the contacts are open.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
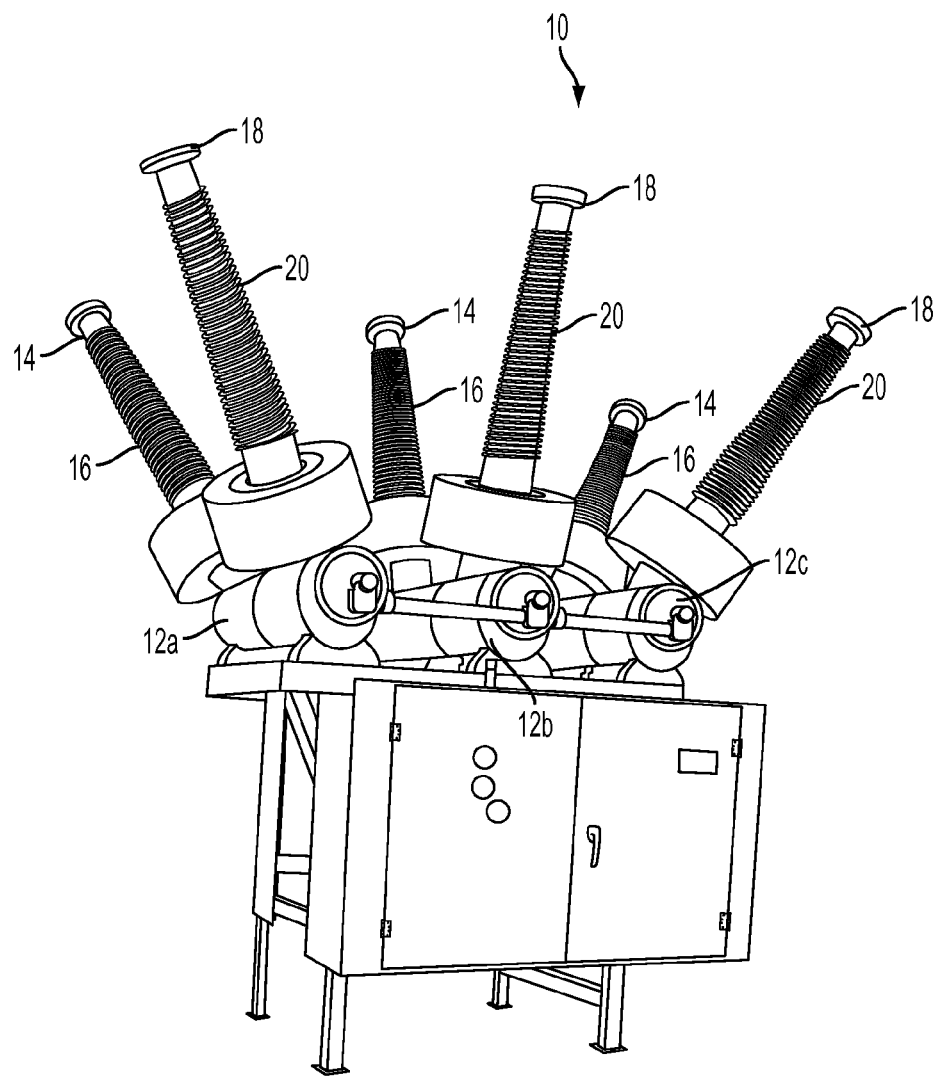
FIG. 1 is a view of a high voltage, dead tank circuit breaker provided in accordance with an embodiment, shown without surge arrestor structure installed.

With reference to FIG. 1, a high-voltage, dead-tank circuit breaker is shown, generally indicated at 10. Circuit breaker 10 is preferably a three phase circuit breaker and thus includes three pole assemblies 12a, 12b and 12c. Each pole assembly 12 includes a first electrical terminal 14 carried in a first bushing 16 and a second electrical terminal 18 carried in a second bushing 20. The bushings 16 and 20 extend generally vertically. Electrical power lines are coupled to the first and second electrical terminals 14 and 18, and the circuit breaker 10 selectively opens or closes the electrical connection there-between. It can be appreciated that the number of pole assemblies 12 can be selected for the desired application and need not be limited to three.

Figure 2:
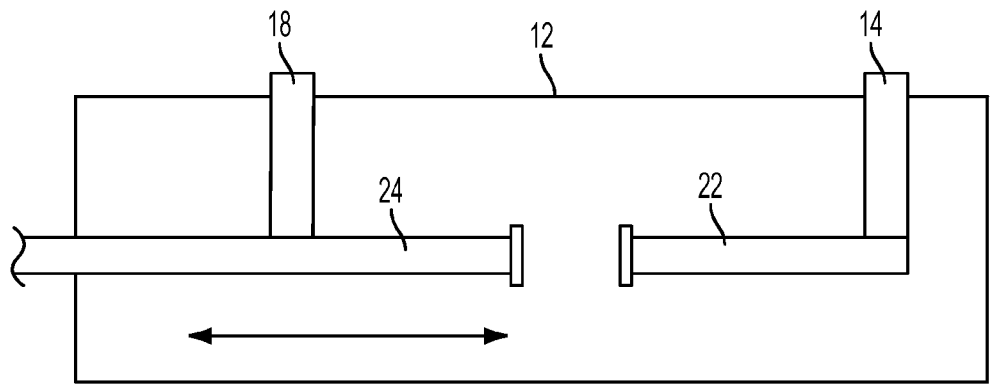
FIG. 2 is a schematic view of an interior of a breaker pole of the circuit breaker of FIG. 1, wherein the electrical contacts are open.

With reference to FIG. 2, a simplified view of an interior of a pole assembly 12 is shown, wherein first electrical terminal 14 is electrically connected to a stationary contact 22 which is immovably secured within pole assembly 12. Second electrical terminal 18 is electrically connected to a movable contact 24 which is carried within pole assembly 12 in a manner allowing longitudinal movement therein. Thus, in a first position, the movable contact 24 may be positioned to break the electrical connection between first the electrical terminal 14 and second electrical terminal 18. In a second position, the movable contact 24 may be brought into contact with stationary contact 22 to electrically connect the first electrical terminal 14 and the second electrical terminal 18. The interior space of pole assemblies 12 are sealed and generally adapted to minimize arcing between stationary contact 22 and movable contact 24. The interior volume of pole assembly 12 may be filled with dielectric material that preferably includes SF6, dry air, dry nitrogen, $CO_2$ or oil. Alternatively, a vacuum-type interrupter could be employed within the tank volume surrounded by dielectric materials mentioned.

Figure 3:
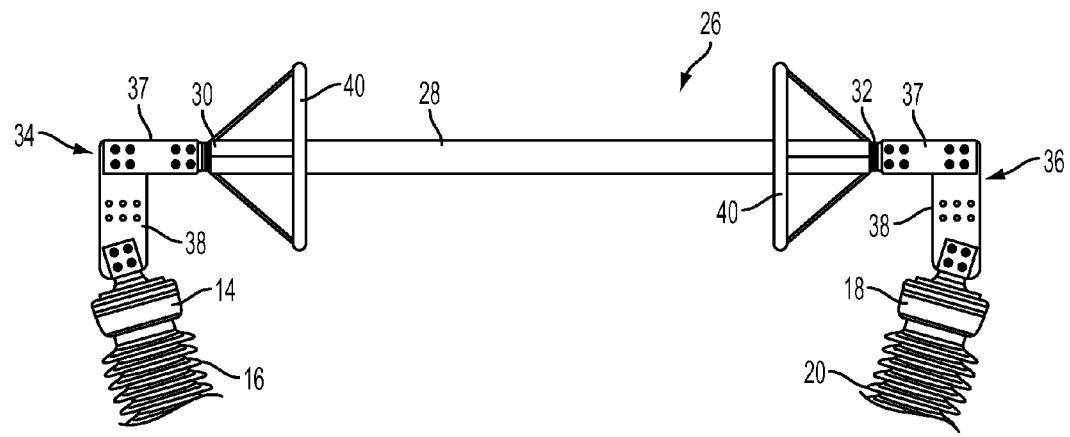
FIG. 3 is a side view of surge arrester structure connected, in a horizontal configuration, across bushing tops of a pole of the circuit breaker of FIG. 1 in accordance with an embodiment.
Figure 4:
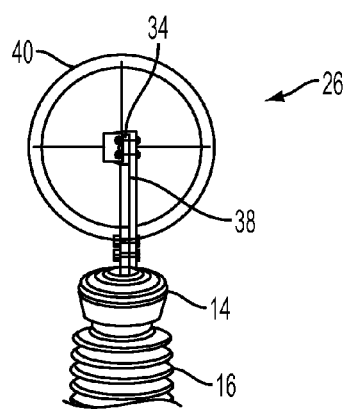
FIG. 4 is an end view of the surge arrester structure of FIG. 3.

With reference to FIGS. 3 and 4, surge arrester structure is shown, generally indicated at 26, in accordance with an embodiment, mounted generally horizontally between the top portions of terminals 14 and 18 of respective bushings 16 and 20. Thus, the surge arrester structure 26 is electrically and mechanically connected across the circuit breaker contacts 22 and 24. Although a surge arrester structure 26 is shown only for one pole 12a, it can be appreciated that a surge arrester structure 26 can be provided for each pole 12a, 12b and 12c of the circuit breaker 10, in the manner similar to that shown in FIG. 3.

The surge arrester structure 26 includes a silicone-housed surge arrester 28 having first and second opposing ends 30 and 32, respectively. First end 30 is electrically and mechanically connected to the terminal 14 via a first conductor structure, generally indicated at 34, and the second end 32 is electrically and mechanically connected to the terminal 18 via second conductor structure, generally indicated at 36. Each of the conductor structures 34 and 36 includes a generally horizontally disposed line terminal 37 and joined therewith, a generally vertically disposed line terminal 38 to provide the electrical and mechanical connection between the end 30, 32 of the arrester 28 and the terminal 14, 18, respectively. Thus, the surge arrester 28 is mounted generally horizontally between the bushings 16 and 20.

The surge arrester 28 includes conventional metal oxide disks (not shown) housed therein and acknowledged for their high energy capability, excellent low level protective characteristics and long life. A conventional grading ring 40 is coupled at each end of 30, 32 of the arrester 28.

As noted above, the surge arrester structure 26 connects electrically across the circuit breaker contacts 22 and 24. The surge arrester structure 26 is bypassed when the circuit breaker 10 is closed. The fast acting surge arrester structure 26 protects the circuit breaker 10 during the open operation or de-energization by clamping the overvoltage exceeding its protective level appearing across the circuit breaker 10. The surge arrester structure 26 is thus a protective device which protects the internal dielectrics of a high-voltage apparatus against the strain of impermissible overvoltage surges. The surge arrester structure 26 thus protects from surges that occur due to switching operations such as a reactor switching application.

Figure 5:
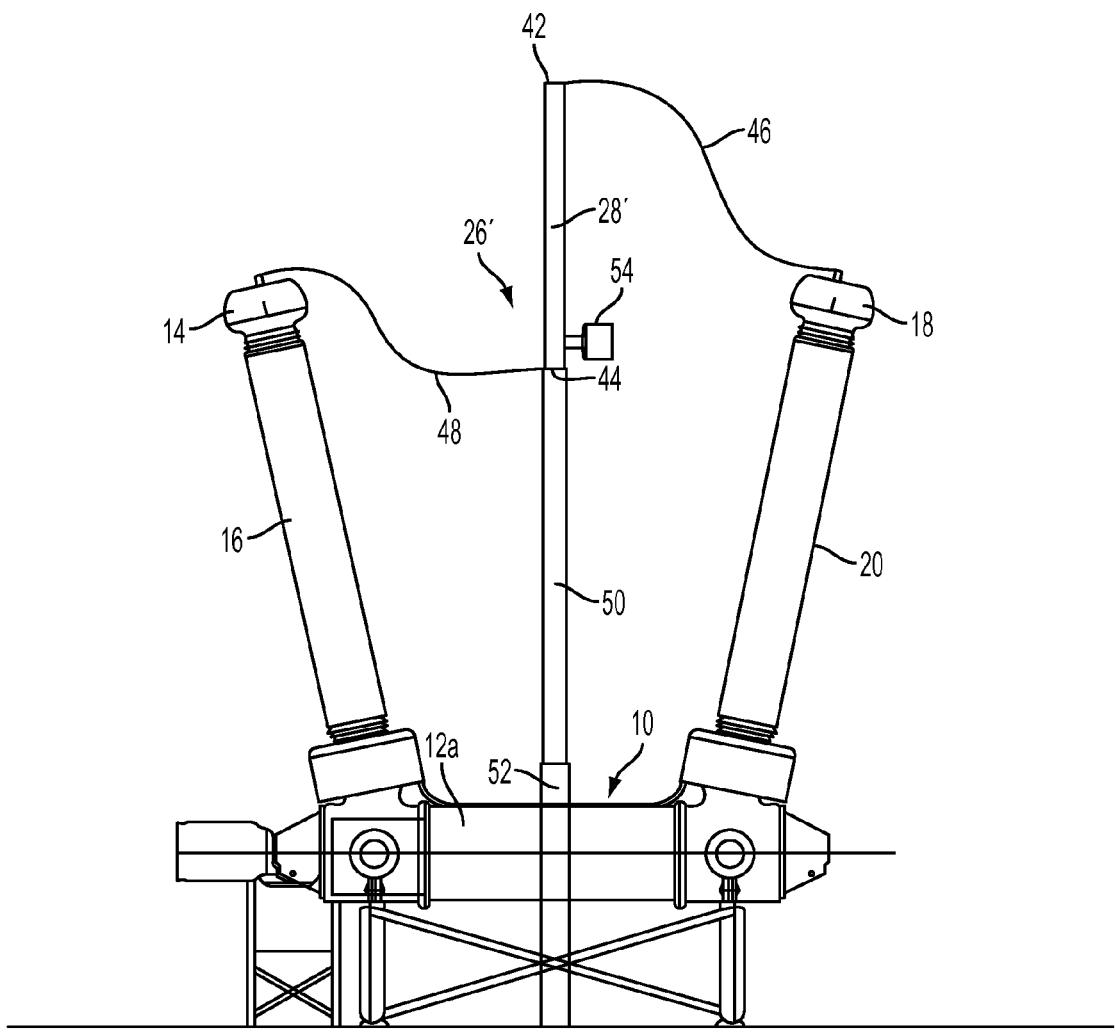
FIG. 5 is a side view of a high voltage, dead tank circuit breaker having surge arrester structure connected, in a vertical configuration, across bushing tops of a pole of a dead tank circuit breaker in accordance with another embodiment.

With reference to FIG. 5, another embodiment of surge arrester structure is shown, generally indicated at 26' preferably for use above 345 kV applications. In this embodiment, the surge arrester structure 26' is mounted generally vertically between the bushings 16 and 20. The surge arrester structure 26' includes a silicone-housed surge arrester 28' having first and second opposing ends 42 and 44, respectively. First end 42 is electrically connected to the top or end of terminal 18 via a conductor structure 46. The second end 44 is electrically connected to the top or end of terminal 14 via a conductor structure 48, preferably with a fusible breakaway connection. The conductor structures 46, 48 can be electrical wires. The surge arrester 28' mounts vertically on a station post insulator 50 and a stand-alone pedestal 52 that are preferably also mounted vertically. Similar to the surge arrester structure 26 of FIG. 3, the surge arrester structure 26' connects electrically across the circuit breaker contacts 22 and 24 and thus functions in a manner similar to that described above.

An optional surge arrester counter 54, such as EXCOUNT from ABB, is mounted to the surge arrester 28' and counts the number of discharges. The counter 54 also records the amplitude of the surges, together with their date and time, and measures the total leakage current and (optionally) resistive current through the arrester 28'. The measurements are stored in the EXCOUNT sensor, and can be collected when convenient with the aid of a hand-held cordless transceiver (not shown).

Conventional surge arresters are not electrically/physically connected across the circuit breaker for overvoltage protection on special switching applications such as reactor switching applications. The conventional surge arresters are typically being used in the industry for lightning impulse protection wherein they are connected line-to-ground closer to the equipment being protected on a separate pedestal. The embodiments disclosed herein are used to limit transient over voltages appearing across the circuit breaker open contacts caused by severe switching duties such as the reactor being de-energized. The surge arrester structure 26, 26' connects parallel and external to the circuit breaker at bushing top terminals 14, 18. By electrically connecting the surge arrester structure 26 parallel to the circuit breaker contacts, the voltage appearing across circuit breaker open contacts 22 and 24 will be clamped. The voltage clamping will be decided by the protective level of the surge arrester structure 26, 26'.

The surge arrester structure 26, 26' can be installed on existing circuit breakers externally without compromising dielectric ratings of the breaker. The surge arrester structure 26 connected directly to the circuit breaker bushing top terminals 14, 18 will not require separate foundation for surge arrester installation. The surge arrester structure 26, 26' that is mounted very close to the circuit breaker contacts is very effective for fast rising transient over voltages.

The surge arrester structure 26, 26' prevents the over voltage going across the interrupter open contacts, therefore reducing the probability of internal flashovers after reactor is de-energized. The voltage stress level on the internal grading capacitors is also reduced due to parallel connection of surge arrester structure 26, 26' in case of multi-break interrupter chamber.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. Surge arrester structure for a dead tank circuit breaker, the circuit breaker having at least one pole assembly with a first electrical terminal carried in a first bushing, and a second electrical terminal carried in a second bushing, the first electrical terminal being electrically connected to a stationary contact which is immovably secured within the pole assembly and the second electrical terminal being electrically connected to a movable contact that is slidable within the pole assembly, the surge arrester structure comprising:
- a surge arrester having first and second opposing ends, and
- a first conductor structure constructed and arranged to electrically and mechanically connect the first end of the surge arrester with an end of the first electrical terminal, and
- second conductor structure constructed and arranged to electrically and mechanically connect the second end of the surge arrester with an end of the second electrical terminal,
- wherein the surge arrester is electrically connected parallel with respect to the stationary and movable contacts so that the surge arrester can limit transient over-voltages occurring across the contacts when the contacts are open,
- wherein the surge arrester structure is in combination with the circuit breaker and wherein the first and second bushings extend generally vertically and the surge arrester extends generally vertically between the bushings.

2. The combination of claim 1, further comprising a surge arrester counter associated with the surge arrester constructed and arranged to count a number of discharges.

3. The combination of claim 1, wherein the surge arrester structure further comprises a stand-alone pedestal and a post insulator mounted to the pedestal, the surge arrester being mounted to the post insulator.

4. The combination of claim 1, wherein each conductor structure includes an electrical wire.

5. The combination of claim 4, wherein at least one connection between the ends of the surge arrester and conductor structures is a breakaway connection.

6. A dead tank circuit breaker comprising:
- at least one pole assembly with a first electrical terminal carried in a first bushing, and a second electrical terminal carried in a second bushing,
- a stationary contact electrically connected to the first electrical terminal, the stationary contact being immovably secured within the pole assembly,
- a movable contact electrically connected to the second electrical terminal, the movable contact being slidable within the pole assembly,
- a surge arrester having first and second opposing ends, and
- first and second conductor structures, the first conductor structure electrically and mechanically connecting the first end of the surge arrester with an end of the first electrical terminal, the second conductor structure electrically and mechanically connecting the second end of the surge arrester with an end of the second electrical terminal to thereby electrically connect the surge arrester parallel with respect to the stationary and movable contacts so that the surge arrester can limit transient over-voltages occurring across the contacts when the contacts are open,
- wherein the first and second bushings extend generally vertically and the surge arrester extends generally vertically between the bushings.

7. The circuit breaker of claim 6, further comprising a surge arrester counter associated with the surge arrester constructed and arranged to count a number of discharges.

8. The circuit breaker of claim 6, further comprises a stand-alone pedestal and a post insulator mounted to the pedestal, the surge arrester being mounted to the post insulator.

9. The circuit breaker of claim 6, wherein each conductor structure includes an electrical wire.

10. The circuit breaker of claim 9, wherein at least one connection between the ends of the surge arrester and conductor structures is a breakaway connection.

11. A method of limiting transient over voltages occurring across first and second contacts of a circuit breaker when the contacts are open, the method comprising the steps of:
- providing a the circuit breaker with at least one pole assembly with a first electrical terminal carried in a first bushing, and a second electrical terminal carried in a second bushing, the first electrical terminal being electrically connected to the first contact and the second electrical terminal being electrically connected to the second contact, and
- electrically and mechanically connecting a first end of a surge arrester with an end of the first electrical terminal,
- electrically and mechanically connecting a second end of the surge arrester with an end of the second electrical terminal to thereby electrically connect the surge arrester parallel with respect to the contacts so that the surge arrester can limit transient over-voltages occurring across the contacts when the contacts are open,
- wherein the first and second bushings are provided to extend generally vertically and the surge arrester extends generally vertically between the bushings.

12. The method of claim 11, further providing a stand-alone pedestal and a post insulator mounted to the pedestal, the surge arrester being mounted to the post insulator.

* * * * *